(12) United States Patent
Babb

(10) Patent No.: US 6,478,522 B2
(45) Date of Patent: Nov. 12, 2002

(54) ROUND BALE HANDLING APPARATUS

(76) Inventor: Brian Babb, P.O. Box 6295 Stn. Main, Bonneyville AB (CA), T9N 2G8

( * ) Notice: Subject to any disclaimer, the term of this patent is extended or adjusted under 35 U.S.C. 154(b) by 0 days.

(21) Appl. No.: 09/765,280

(22) Filed: Jan. 23, 2001

(65) Prior Publication Data

US 2001/0012480 A1 Aug. 9, 2001

(51) Int. Cl.⁷ .................................................. B60P 1/16
(52) U.S. Cl. ........................ 414/24.5; 298/18; 414/111
(58) Field of Search ........................... 298/18; 414/24.5, 414/24.6, 111

(56) References Cited

U.S. PATENT DOCUMENTS

| 3,876,098 | A | * | 4/1975 | Cawrse et al. ............... 414/111 |
| 3,922,036 | A | * | 11/1975 | Kalsbeck et al. ............. 298/18 |
| 4,500,242 | A | | 2/1985 | Beikman |
| 4,580,843 | A | | 4/1986 | Lund |
| 4,930,958 | A | | 6/1990 | Palmer |
| 5,018,924 | A | | 5/1991 | Palmer |
| 5,076,752 | A | | 12/1991 | Rader |
| 5,123,800 | A | | 6/1992 | Druse, Sr. |
| 5,180,271 | A | | 1/1993 | Farden |
| 5,277,537 | A | | 1/1994 | Druse, Sr. |
| 5,320,477 | A | | 6/1994 | Druse, Sr. |
| 5,340,259 | A | | 8/1994 | Flaskey |
| 6,079,926 | A | * | 6/2000 | Cox et al. .................... 414/111 |

FOREIGN PATENT DOCUMENTS

| CA | 1211739 | | 9/1986 | |
| DE | 23 49 779 | * | 4/1975 | ................ 414/111 |
| FR | 2 496 397 | * | 6/1982 | ................ 414/111 |
| SU | 1250207 | * | 8/1986 | ................ 414/111 |

* cited by examiner

Primary Examiner—Janice L. Krizek
(74) Attorney, Agent, or Firm—Bennett Jones LLP

(57) ABSTRACT

A bale handling apparatus is mounted to a trailer and includes a frame, upper and lower bale cradles, cradle actuating hydraulic cylinders and upper and lower bale retaining means. Each bale cradle may be pivoted to eject bales. Each upper bale cradle is disposed directly above a lower bale cradle.

10 Claims, 3 Drawing Sheets

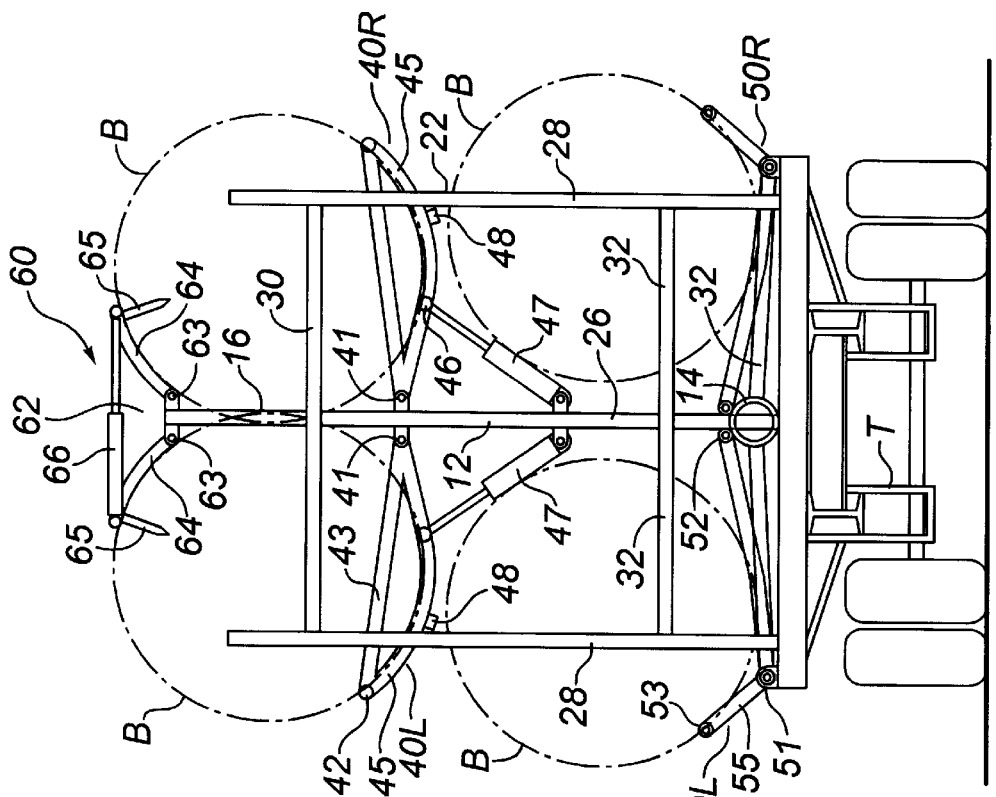
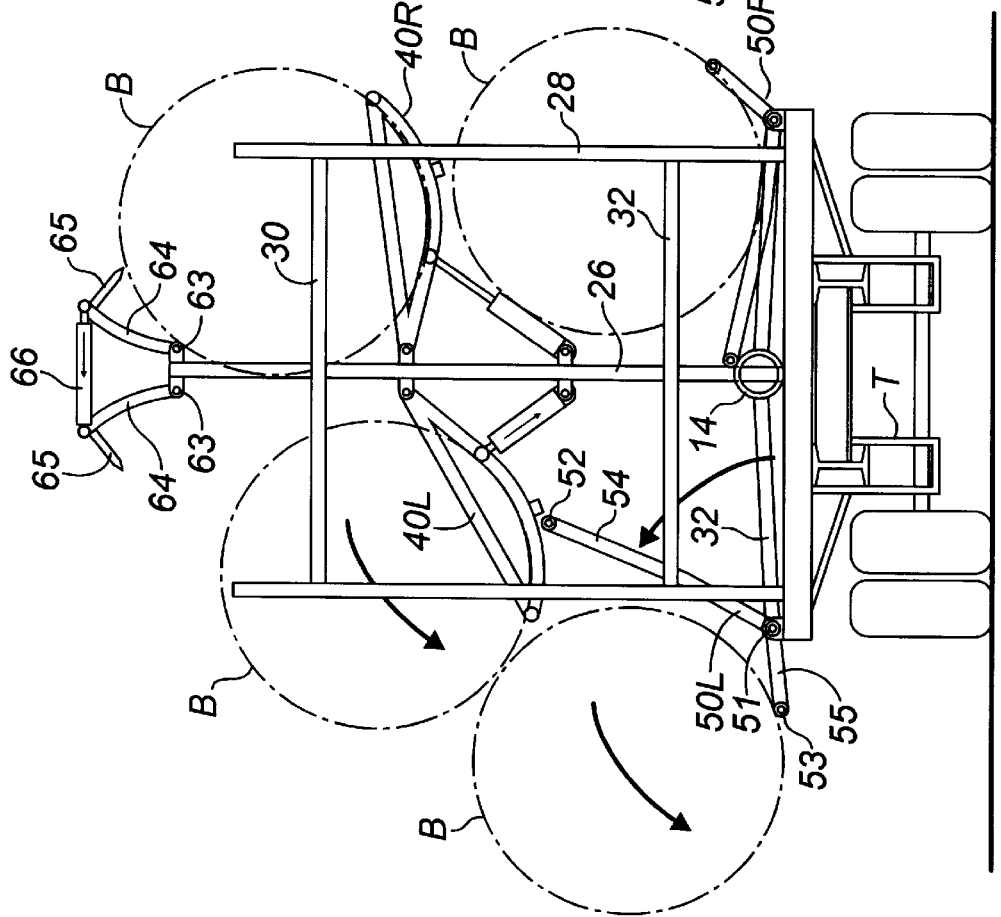

ROUND BALE HANDLING APPARATUS

FIELD OF THE INVENTION

The present invention relates to a bale handling apparatus. In particular, the bale handling apparatus is adapted to receive, carry and unload large round bales of hay.

BACKGROUND OF THE INVENTION

In the agricultural industry, there is need for means of transporting hay bales from site to site. A popular bale configuration is the large round bale which is cylindrical. A typical round bale may be 5 feet in length, 6 feet in diameter and weigh in excess of 1200 pounds. Such bales are typically transported on flat bed trailers in two rows of bales, side by side. Often, it is attempted to transport additional bales by placing a third or fourth row of bales on top of the bottom two rows and securing the bales by straps over top of the stacked bales. Often the straps become loose or break, resulting in the bales being lost, possibly with disastrous consequences for any following or oncoming vehicle.

There have been many attempts in the prior art to create a bale handling apparatus which may carry multiple bales. Some apparatuses allow for the stacking of bales. For example, U.S. Pat. No. 5,320,477 (Druse Sr.) discloses a bale carrier which provides means for carrying a third row of bales on top of and between the lower two rows. A push-off arm is mounted to a vertical hydraulic cylinder to unload the third row. However, neither the bottom two rows nor the third row of bales is secured. As well, the third row of bales rests in the valley between the two bottom rows, where the weight of the third row of bales tends to push the bottom two rows apart or outward, which may create unstable conditions during transport.

It would be advantageous to have an apparatus which could transport multiple rows of bales without the need for straps or the fear of the bales breaking loose. Therefore, there is a need in the art for an apparatus which permits the carriage of four rows of round bales in a secure manner and which provides for convenient loading and unloading of such bales.

SUMMARY OF THE INVENTION

The invention comprises a bale handling apparatus which is adapted to receive, carry and unload large round hay bales. In one embodiment, the apparatus comprises:
  (a) a wheeled vehicle or trailer having an elongate structural frame which includes an upright support frame;
  (b) a pair of elongate side-by-side lower bale cradles, each of which is pivotably mounted to the vehicle, trailer or frame and moveable between a first bale retaining position and a second bale ejection position;
  (c) a pair of elongate side-by-side upper bale cradles, each of which is pivotably mounted to the upright support frame and moveable between a first bale retaining position and a second bale ejection position;
  (d) actuation means for moving the lower bale cradle between its first and second positions; and
  (e) actuation means for moving the upper bale cradle between its first and second positions.
Each upper bale cradle may be positioned above a lower bale cradle such that when a bale is positioned within the lower bale cradle, the upper bale cradle may be pivotally moved to a third position where the upper bale cradle rests on or clamps down onto the bale positioned within the lower bale cradle. Each upper bale cradle may comprise means for physically retaining a bale positioned in a lower bale cradle. The retention means may comprise a longitudinal bar which is attached to the underside of the upper bale cradle.

In one embodiment, the apparatus may further comprise means for retaining a bale positioned in the upper cradles. The upper bale retention means may comprise a plurality of prongs attached to the upright support frame which engage bales positioned in an upper bale cradle. The prongs may be mounted mounted to a pair of pivoting assemblies each comprising an elongate bar rotatably mounted to the upright support frame such that the assembly is pivotable between a first open position and a second bale retaining position; and actuating means for moving the elongate bars to and between their first and second positions.

In one embodiment, each lower bale cradle may comprise a longitudinal central support beam which is pivotally attached to the frame, an inner edge beam and an outer edge beam, a plurality of inner cross-members which attach the inner edge beam to the central support beam and a plurality of outer cross-members which attach the outer edge beam to the central support beam, wherein the inner cross members are longer than the outer cross-members.

In one embodiment, the upper cradle actuation means comprises a hydraulic cylinder having one end attached to the frame and one end attached to the upper cradle such that extension of the hydraulic cylinder raises the upper cradle to its first position and retraction of the hydraulic cylinder lowers the upper cradle to its second position. The lower cradle actuation means may comprise a hydraulic cylinder having one end secured to the frame and one end attached, directly or indirectly, to the lower cradle such that extension and retraction of the hydraulic cylinder causes the lower cradle to move between its first and second positions.

BRIEF DESCRIPTION OF THE DRAWINGS

The invention will now be described by way of an exemplary embodiment with reference to the accompanying simplified, diagrammatic, not-to-scale drawings. In the drawings:

FIG. 2 is an end view of the embodiment of FIG. 1 showing four rows of bales loaded in the apparatus.

FIG. 3 is an end view showing the left hand upper and lower bale cradles in their unloading position.

DETAILED DESCRIPTION OF THE INVENTION

Figure 1:
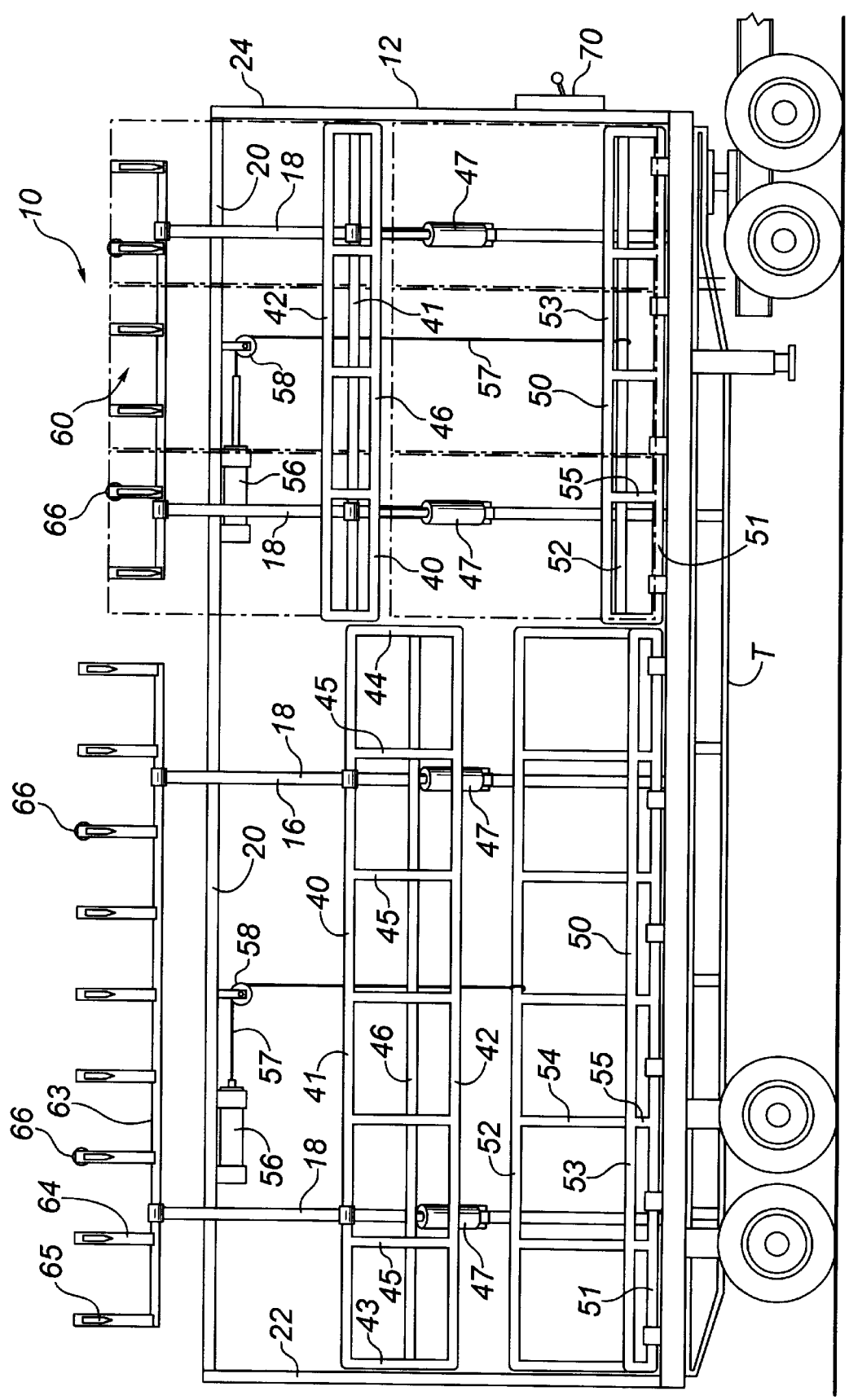
FIG. 1 is a side view of the apparatus as part of a flat bed trailer.

The present invention provides for a round bale handling apparatus. The apparatus (10) according to the Figures comprises a frame (12) which is securely mounted to a flat bed trailer (T). The type of vehicle to which the apparatus is mounted is not essential to the invention. For example, the apparatus may be mounted to a low-boy trailer, a high-boy trailer or a flat bed truck. Any vehicle with a deck to which the frame may be mounted may be suitable. The frame may be separate from but attached to the vehicle. Alternatively, the vehicle itself may form part of the frame. The size of the vehicle and frame is also not an element of the invention, although it may be noted that the invention may be particularly adapted for use with larger tractor-trailer configurations.

The frame (12) may include a central backbone pipe (14) which extends the length of the frame (12) and is bolted securely to the trailer. A longitudinal subframe (16) includes a plurality of upright supports (18) which are attached to the backbone (14) at regular intervals and extend upwards. Each upright support (18) is attached to an upper longitudinal beam (20) which is vertically aligned with the backbone (14). The longitudinal subframe (16) is intended to vertically support the weight of the apparatus (10). The longitudinal subframe (16) is supported in an upright position by upright box subframes (22, 24) located at each end of the frame (12). Each box subframe (22, 24) comprises a central upright support (26), a pair of outlying upright supports (28) and upper (30) and lower (32) transverse beams as is shown in FIGS. 2 and 3. The frame (12) may be constructed from round or square steel tubing and assembled using conventional fasteners or by welding.

The primary purpose of the frame (12) is to structurally support the bale cradles and the bale cradle activating means which are described below. Additional support struts or reinforcing members may be strategically placed where necessary. The specific configuration and construction of the frame (12) is not essential to the invention so long as the structural support required is provided.

In the embodiment illustrated in FIG. 1, two sets of upper bale cradles (40) and lower bale cradles (50) are provided and mounted to the frame (12) or trailer (T). A single set of bale cradles consists of a left side lower cradle (50L), a right side lower cradle (50R), a left side upper cradle (40L) and a right side upper cradle (40R).

In the embodiment illustrated, each upper cradle (40) comprises a rectangular frame comprising an inner beam (41), an outer beam (42) and two end beams (43, 44) and a plurality of arcuate cross-members (45) which are parallel to the end beams. A longitudinal support beam (46) is attached to the underside of each cross-member (45) between the inner (41) and outer (42) beams to provide additional structural support. As is apparent, the cross-members (45) form a concave shape to receive a round bale (B) as is depicted in the Figures. The inner beam (41) is pivotally mounted to the frame (12), such that the upper cradle (40) may pivot about a longitudinal horizontal axis as is shown in FIGS. 2 and 3. The pivoting motion of the upper cradle (40) is controlled by actuation means. In the embodiment shown, the actuation means comprises hydraulic cylinders (47) having one end secured to the frame and another end attached to the longitudinal support beam (46). As is illustrated in FIG. 3, when the hydraulic cylinders (47) are retracted, the upper cradle (40) pivots downward to its bale unloading position. Conversely, when the hydraulic cylinder (47) is extended, the upper cradle (40) pivots upwards to its bale retaining position.

In the embodiment illustrated, each lower cradle (50) comprises a central longitudinal support beam (51) together with a pair of spaced inner (52) and outer edge (53) beams. A plurality of interconnecting cross-members (54, 55) support the edge beams (53) relative to the central support beam (51). The cross-members (54, 55) are arranged at a shallow angle for receiving a bale (B) as is shown in the Figures. The inner cross-members (54) are longer than the outer cross-members (55) such that when the lower cradle (50) is in its bale retaining position, the outer cross-members (55) are more upright than the inner cross-members (54). As a result, the bale (B) rests primarily on the inner cross-members (54) when the lower cradle is in its bale retaining position. The weight of the bale (B) tends to keep the lower cradle (50) in this position.

In the embodiment shown, the central support beam (51) of each lower cradle is pivotally mounted directly to the deck of the trailer (T), such that the lower cradle (50) is supported by the trailer (T) itself and may pivot about a longitudinal horizontal axis. Thus, the inner beam (52) of each lower cradle (50) may be flipped upwards, as is shown in FIG. 3, to unload bales which are positioned in the lower cradle (50). The actuating means for pivoting each lower cradle is, in the illustrated embodiment, a hydraulic cylinder (56) which is rigidly attached to the frame (12) underneath the upper longitudinal beam (20). One end of the hydraulic cylinder (56) is attached to a cable (57) which passes over a pulley (58) and is connected at its other end to the inner beam (52). Retraction of the hydraulic cylinder (56) lifts the inner beam (52) which causes the lower cradle (50) to pivot about its central support beam (51).

Alternatively, the hydraulic cylinder which actuates the lower cradles may be disposed vertically such that one end is attached to the upper longitudinal beam (20) while the other end is attached by a cable or a rod to a transverse pipe (not shown) which may lift the inner beams of opposing lower cradles when the hydraulic cylinder is retracted.

As is apparent to one skilled in the art, the hydraulic cylinders may be configured in alternative positions than those described above or illustrated to actuate movement of the bale cradles. Furthermore, in place of hydraulic cylinders, one skilled in the art may use motors with cable and winch assemblies or with drive gears, or other well-known actuating means, to actuate movement of the upper or lower bale cradles.

Hydraulic fluid pressure and return lines are not shown. The connection of the hydraulic system is well within the knowledge of one skilled in the art. The hydraulic controls (70) may be conveniently mounted on the forward box subframe (24).

The bales (B) positioned in the lower cradles (50) are retained within the cradle by the concave shape of the lower cradle (50) and also by the underside of the upper cradles (40). As is apparent from the position of the upper cradle relative to a bale loaded in the lower cradle (50), the upper cradles (40) may be lowered so as to rest on or apply force to a bale positioned in the lower cradle. Optionally, a retaining member in the form of a bar (48) which runs longitudinally along the underside of the upper cradle (40) may be provided to physically restrain a bale in the lower cradle (50). Alternatively, the retaining member may comprise a number of small spikes (not shown) mounted on the underside of an upper cradle which engage a lower bale when the upper cradle is lowered slightly.

The bales (B) positioned in the upper cradles (40) are retained within the cradle by the concave shape of the cradle and the weight of the bale. If additional security is desired, one embodiment of the invention provides an upper bale retaining mechanism (60). In the embodiment illustrated in FIGS. 2 and 3, the mechanism comprises a pair of elongate spike bearing assemblies (62) which are pivotally attached to the top of the upright longitudinal support subframe (16). Each assembly includes a longitudinal bar (63), a plurality of spike holders (64) which extend transversely from the longitudinal bar wherein each spike holder (64) bears a spike (65) which extends downwardly. Each spike (65) and spike holder (64) combination may of course be of unitary construction. When engaged, the assemblies (62) are pivoted downward such that the spikes (65) engage the bales (B) in the upper cradles (46), as is shown in FIG. 2. To unload the upper bales, the assemblies (62) are pivoted upwards to release the spikes (65), as is shown in FIG. 3. The assemblies (62) may be pivoted by a hydraulic cylinder (66) which is disposed between adjacent assemblies (62) and which has one end attached to one longitudinal bar (63) while the other end is attached to the opposing longitudinal bar (63).

Figure 4:
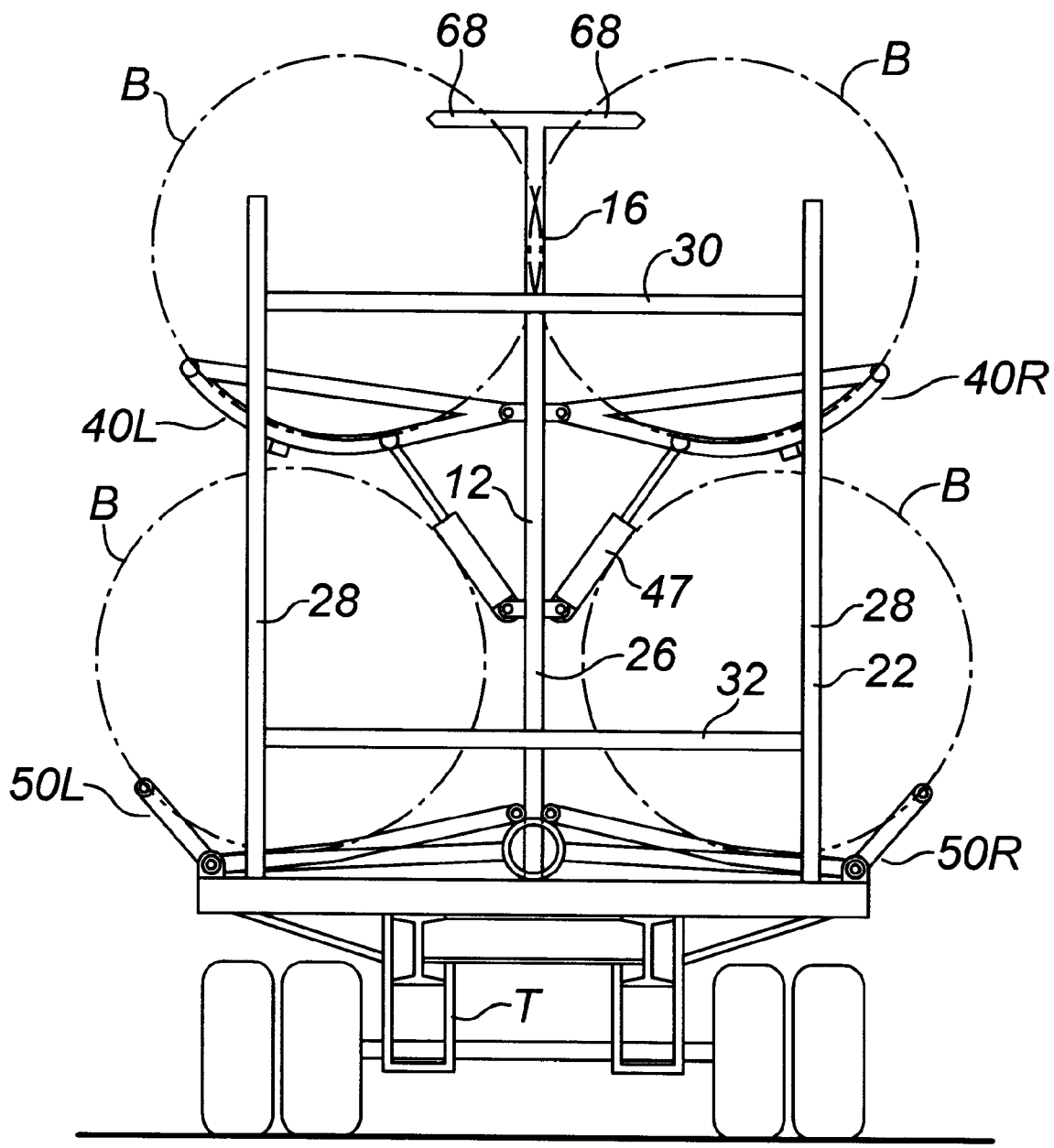
FIG. 4 is an end view showing an alternative upper bale retaining means.

Alternatively, immovable spikes (68) which are affixed to the longitudinal subframe (16) may be provided to assist in retaining upper bales. These spikes (68) may be positioned to engage a bale as the bale is loaded into an upper cradle, as is shown in FIG. 4.

To load the apparatus, all of the upper and lower bale cradles may be moved to their bale retaining positions and the upper bale retaining mechanism (60) opened. There should be sufficient clearance between an upper bale cradle (40) and a lower bale cradle (50) so that a bale (B) may be received in the lower bale cradle. The clearance however should not be so large as to require much mount for the upper bale cradle to clamp down on the bale in the lower bale cradle. Bales may then be loaded into the lower bale cradles. Then, the upper cradles may be lowered slightly to clamp down on the bales in the lower cradles. Bales may then be loaded into the upper cradles and the upper bale retaining mechanism (60) closed. To unload the apparatus, the upper bale retaining mechanism is opened and the upper cradles raised clear of the lower bales. The lower cradles may then be pivoted to eject the bales as is shown in FIG. 3. Once the lower bales are ejected, the upper cradles may be lowered to eject the upper bales as is shown in FIG. 3.

As will be apparent to those skilled in the art, various modifications, adaptations and variations of the foregoing specific disclosure can be made without departing from the scope of the invention claimed herein.

What is claimed is:

1. A bale handling apparatus comprising:
   (a) a wheeled vehicle having an elongate structural frame which includes an upright support frame;
   (b) a pair of elongate side-by-side lower bale cradles, each of which is adapted to carry at least one bale, and each of which is pivotably mounted to the structural frame and moveable between a first bale retaining position and a second bale ejection position;
   (c) a pair of elongate side-by-side upper bale cradles, each of which is adapted to carry at least one bale, and each of which is pivotably mounted to the upright support frame and moveable between a first bale retaining position and a second bale ejection position;
   (d) actuation means for moving each lower bale cradle between its first and second positions; and
   (e) actuation means for moving each upper bale cradle between its first and second positions.

2. The apparatus of claim 1 wherein each upper bale cradle is positioned above a lower bale cradle such that when a bale is positioned within the lower bale cradle, the upper bale cradle may be pivotally moved to a third position where the upper bale cradle rests on or clamps down onto the bale positioned within the lower bale cradle.

3. The apparatus of claim 2 wherein each upper bale cradle comprises means for physically retaining a bale positioned in a lower bale cradle.

4. The apparatus of claim 3 wherein said retention means comprises a longitudinal bar which is attached to the underside of the upper bale cradle.

5. The apparatus of claim 1 further comprising means for retaining a bale positioned in the upper cradles.

6. The apparatus of claim 5 wherein the upper bale retention means comprises a plurality of prongs attached to the upright support frame which engage bales positioned in an upper bale cradle.

7. The apparatus of claim 6 wherein the prongs are mounted to a pair of pivoting assemblies each comprising an elongate bar rotatably mounted to the upright support frame such that each assembly is pivotable between a first open position and second bale retaining position; and actuation means for moving each of the assemblies into and between their first and second positions.

8. The apparatus of claim 1 wherein each lower bale cradle comprises a longitudinal central support beam which is pivotally attached to the structural frame, an inner edge beam and an outer edge beam, a plurality of inner cross-members which attach the inner edge beam to the central support beam and a plurality of outer cross-members which attach the outer edge beam to the central support beam, wherein the inner cross-members are longer than the outer cross-members.

9. The apparatus of claim 1 wherein the upper cradle actuation means comprises a hydraulic cylinder having one end attached to the structural frame and one end attached to each upper cradle such that extension of the hydraulic cylinder raises each upper cradle to its first position and retraction of the hydraulic cylinder lowers each upper cradle to its second position.

10. The apparatus of claim 1 wherein the lower cradle actuation means comprises a hydraulic cylinder having one end secured to the frame and one end operatively connected, to each lower cradle such that extension and retraction of the hydraulic cylinder causes each lower cradle to move between its first and second positions.

* * * * *